(12) United States Patent  (10) Patent No.: US 8,909,142 B2
Wu  (45) Date of Patent: Dec. 9, 2014

(54) DEVICE, EQUIPMENT AND METHOD FOR DATA TRANSMISSION BY TOUCH

(75) Inventor: Hongchao Wu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 171 days.

(21) Appl. No.: 13/580,150

(22) PCT Filed: Sep. 14, 2010

(86) PCT No.: PCT/CN2010/076896
§ 371 (c)(1),
(2), (4) Date: Aug. 21, 2012

(87) PCT Pub. No.: WO2012/009874
PCT Pub. Date: Jan. 26, 2012

(65) Prior Publication Data
US 2012/0315050 A1   Dec. 13, 2012

(30) Foreign Application Priority Data

Jul. 21, 2010  (CN) .......................... 2010 1 0234810

(51) Int. Cl.
*H04B 5/00* (2006.01)
*H04B 7/00* (2006.01)
*H04M 1/725* (2006.01)
*G06F 3/0488* (2013.01)
*H04W 88/02* (2009.01)

(52) U.S. Cl.
CPC ......... *H04M 1/7253* (2013.01); *G06F 3/04883* (2013.01); *H04W 88/02* (2013.01); *H04M 2250/22* (2013.01); *H04M 2250/64* (2013.01); *H04M 2250/12* (2013.01)
USPC ........................................ 455/41.1; 455/41.2

(58) Field of Classification Search
CPC ............ G06F 3/04883; H04M 1/7253; H04M 2250/12; H04M 2250/22; H04M 2250/64; H04W 88/02
USPC ................................................ 455/41.1, 41.2
See application file for complete search history.

(56) References Cited

U.S. PATENT DOCUMENTS

2003/0174048 A1* 9/2003 McCorkle .................. 340/10.34
2007/0122153 A1* 5/2007 Tamai ............................ 398/77

(Continued)

FOREIGN PATENT DOCUMENTS

CN   101156993 A   4/2008
CN   101201720 A   6/2008

(Continued)

OTHER PUBLICATIONS

Supplementary European Search Report in European application No. 10854904.9, mailed on Apr. 4, 2014.

(Continued)

*Primary Examiner* — Ping Hsieh
*Assistant Examiner* — Xin Jia
(74) *Attorney, Agent, or Firm* — Oppedahl Patent Law Firm LLC (57) ABSTRACT

The disclosure provides a direction sensor, including a transmission device and a reception device, wherein the transmission device contains an encoding chip for encoding the equipment ID of local equipment into a binary signal, a transmission circuit for adjusting the binary signal to a pulse electric signal and an electromagnetic wave generator for sending the pulse electric signal in the form of electromagnetic wave; and the reception device contains a photoelectric converter for receiving the electromagnetic wave and converting the electromagnetic wave to a pulse electric signal, a reception circuit for converting the pulse electric signal to a binary signal and sending the binary signal to a decoding chip and the decoding chip for reading equipment IDs of other equipment from the binary signal, obtaining the equipment ID of the local equipment, and sending the read equipment ID and a sensor code of the sensor itself when determining that a read equipment ID is different from the equipment ID of the local equipment. The disclosure also provides a device, equipment and method for data transmission by touch. Application of the device, equipment and method provided by the disclosure enables a simple and explicit data transmission procedure and provides convenience for user operation.

10 Claims, 5 Drawing Sheets

(56) References Cited

U.S. PATENT DOCUMENTS

| | | |
|---|---|---|
| 2007/0143585 A1* | 6/2007 | Ring et al. ............... 713/1 |
| 2008/0081649 A1 | 4/2008 | Nagata |
| 2008/0143685 A1 | 6/2008 | Lee |
| 2009/0054108 A1 | 2/2009 | Kito |
| 2009/0140986 A1 | 6/2009 | Karkkainen |
| 2010/0083189 A1 | 4/2010 | Arlein |
| 2010/0136923 A1* | 6/2010 | Rofougaran ............... 455/73 |
| 2010/0156812 A1 | 6/2010 | Stallings |
| 2010/0169814 A1 | 7/2010 | Zhang |

FOREIGN PATENT DOCUMENTS

| | | |
|---|---|---|
| CN | 101763328 A | 6/2010 |
| EP | 1933243 A2 | 6/2008 |
| JP | 2004228804 A | 8/2004 |
| JP | 3910541 B2 | 2/2007 |

OTHER PUBLICATIONS

International Search Report in international application No. PCT/CN2010/076896, mailed on Apr. 28, 2011.

English Translation of the Written Opinion of the International Search Authority in international application No. PCT/CN2010/076896, mailed on Apr. 28, 2011.

* cited by examiner

DEVICE, EQUIPMENT AND METHOD FOR DATA TRANSMISSION BY TOUCH

TECHNICAL FIELD

The disclosure relates to the field of wireless data transmission, in particular to a device, equipment and method for data transmission by touch.

BACKGROUND

In recent years, portable mobile terminals, such as mobile phones, tablet Personal Computers (PC), e-books or the like are developed rapidly and have become the indispensable partners of people in life and job. In the same place, people often want to share data in their own mobile terminals with other persons immediately and without spatial limitation, for example, sharing photos and music in mobile phones or e-books among friends, sharing maps in mobile tablet PCs among scientific workers, or the like. The ubiquitous wireless network meets the requirements, now mobile terminals are interconnected through wireless modules such as Bluetooth or the like rather than data lines. Consequently, the data in a local mobile terminal can be transmitted to any other mobile terminal which is accessed to the wireless network.

However, an existing method for data transmission through a wireless network has the disadvantages as follows:

firstly, one wireless network may be connected with a plenty of mobile terminals, however, the names of the mobile terminals in the network cannot always reflect the characteristics of the mobile terminals correctly; when a user wants to transmit data from its mobile terminal to another mobile terminal in the network, the user probably cannot distinguish a mobile terminal which is waiting for receiving the data from the numerous mobile terminals according to their names. Such case brings the user some perplexities and results in incorrect data transmission sometimes;

secondly, although the mobile terminal which is waiting for receiving data is close to the mobile terminal which transmits the data in the same place, the user still needs to input some menu commands or program rows on its mobile terminal to complete the data transmission. As far as the user who wants to share data among adjacent mobile terminals immediately, such data transmission method is fussy and inexplicit and brings people a certain burden.

SUMMARY

On that account, the main purpose of the disclosure is to provide a device, equipment and method for data transmission by touch, through which data can be directly transmitted to equipment in the direction touched by a touched graph; the transmission process is simple and explicit, and great convenience is provided for user operation.

In order to realize the purpose above, the technical solution of the disclosure is realized in this way.

The disclosure provides a direction sensor which includes a transmission device and a reception device, wherein
the transmission device includes:
an encoding chip configured to obtain an equipment ID of local equipment, encode the equipment ID of the local equipment to obtain a binary signal and send the binary signal to a transmission circuit;
the transmission circuit configured to modulate the binary signal into a pulse electric signal and send the pulse electric signal to an electromagnetic wave generator; and
the electromagnetic wave generator configured to send the pulse electric signal in the form of electromagnetic wave; and
the reception device includes:
a photoelectric converter configured to receive an electromagnetic wave, convert the electromagnetic wave into a pulse electric signal, and send the pulse electric signal to a reception circuit;
the reception circuit configured to convert the pulse electric signal into a binary signal and send the binary signal to a decoding chip; and
the decoding chip configured to read equipment IDs of other equipment from the binary signal, obtain the equipment ID of the local equipment, compare the read equipment IDs with the equipment ID of the local equipment, and when determining that a read equipment ID is different from the equipment ID of the local equipment, send the read equipment ID and a sensor code of the direction sensor.

The disclosure also provides a device for data transmission by touch, and the device includes:
at least one direction sensor configured to receive an electromagnetic wave, obtain equipment IDs of other equipment in a space where the direction sensor is, and send obtained equipment IDs and a sensor code of the direction sensor itself to a Central Processing Unit (CPU);
a touch screen configured to send a signal about a touched graph to a touch screen controller according to a graph touch operation performed by a user;
the touch screen controller configured to convert the signal about the touched graph into a graphic edge coordinate through analogue-digital conversion and send the graphic edge coordinate to the CPU;
the CPU configured to pair the equipment IDs with a preset direction code, determine a user touch operation to trigger a data transmission command according to the graphic edge coordinate, and send an equipment ID in a direction touched by the graph to a wireless module; and
the wireless module configured to transmit data to equipment corresponding to the received equipment ID.

In the solution above, the device may further include a memory controller configured to receive from the CPU a request that the direction sensor requests to obtain an equipment ID of local equipment, and send the equipment ID of the local equipment to the direction sensor.

In the solution, the direction sensor may be further configured to receive the electromagnetic wave, demodulate the wave into a pulse electric signal, convert the pulse electric signal into a binary signal, read the equipment IDs of said other equipment from the binary signal; send the request of obtaining the equipment ID of the local equipment to the CPU, receive the equipment ID of the local equipment, compare the equipment ID of the local equipment with the read equipment IDs, and when determining that the equipment ID of the local equipment is different from a read equipment ID, send the read equipment ID and the sensor code of the direction sensor itself to the CPU; and the CPU may be further configured to send the request of obtaining the equipment ID of the local equipment to the memory controller; receive the read equipment ID and the sensor code, inquire about a stored direction code corresponding to the sensor code, associate the received equipment ID with the direction code corresponding to the sensor code and store them; compare the graphic edge coordinate received with a stored display edge coordinate, and when determining the graph touches a direction display edge, determine the touch operation to trigger the data transmission command; or compare the graphic edge coordinate received with a stored display region coordinate, when determining that the graph enters into a direction display region, determine the touch operation to trigger the data transmission command; inquire about a direction code corresponding to a coordinate of the display edge touched by the graph or a coordinate of the display region where the graph enters, and send an equipment ID associated with the direction code to the wireless module.

The disclosure also provides equipment for data transmission by touch, and the equipment includes: a display controller, a display, a power source, an external interface, other input and output equipment and other input and output controllers, and further includes:

at least one direction sensor configured to receive an electromagnetic wave, obtain equipment IDs of other equipment in a space where the direction sensor is, and send obtained equipment IDs and a sensor code of the direction sensor itself to a CPU;

a touch screen configured to send a signal about a touched graph to a touch screen controller according to a graph touch operation performed by a user;

the touch screen controller configured to convert the signal about the touched graph into a graphic edge coordinate through analogue-digital conversion and send the graphic edge coordinate to the CPU;

the CPU configured to pair the equipment IDs with a preset direction code; determine a user touch operation to trigger a data transmission command according to the graphic edge coordinate, and send an equipment ID in a direction touched by the graph to a wireless module; and determine an event corresponding to the graphic edge coordinate and send an event signal to the display controller; and the wireless module configured to transmit data to equipment corresponding to the received equipment ID.

The disclosure also provides a method for data transmission by touch, and the method includes:

receiving an electromagnetic wave from other equipment; obtaining equipment IDs of said other equipment; pairing a preset direction code with obtained equipment IDs; when a user performs a touch operation on a graph, detecting a graphic edge coordinate of the touched graph; determining a touch operation to trigger a data transmission command according to the graphic edge coordinate; and sending data to equipment in a direction touched by the graph according to a direction code of the direction touched by the graph and a corresponding equipment ID when the touch operation triggers the data transmission command.

In the solution above, the receiving an electromagnetic wave from other equipment, obtaining equipment IDs of said other equipment, and pairing a preset direction code with obtained equipment IDs may include: receiving, by a direction sensor, the electromagnetic wave; demodulating, by the direction sensor, the received electromagnetic wave into a pulse electrical signal and converting, by the direction sensor, the pulse electric signal into a binary signal; reading, by the direction sensor, the equipment IDs of said other equipment from the binary signal, comparing, by the direction sensor, the equipment IDs with an equipment ID of local equipment, and when determining that a read equipment ID is inconsistent with the equipment ID of the local equipment, reporting, by the direction sensor, the read equipment ID and a sensor coder of the direction sensor itself to a Central Processing Unit (CPU); and associating, by the CPU, the read equipment ID with a direction code corresponding to the sensor code and storing them by the CPU.

In the solution above, the determining a touch operation to trigger a data transmission command according to the graphic edge coordinate may include:

comparing, by the CPU, a received graphic edge coordinate with a stored display edge coordinate, and determining, by the CPU, the touch operation to trigger the data transmission command when any graphic edge coordinate is consistent with any display edge coordinate which indicates that the graph touches a display edge; or comparing, by the CPU, a received graphic edge coordinate with a stored display region coordinate, and determining, by the CPU, the touch operation to trigger the data transmission command when all graphic edge coordinates are consistent with display region coordinates which indicates that the graph enters into a direction display region.

In the solution above, the sending data to equipment in a direction touched by the graph according to a direction code of the direction touched by the graph and a corresponding equipment ID when the touch operation triggers the data transmission command may include:

inquiring about a direction code corresponding to a coordinate of the display edge touched by the graph or to a coordinate of the display region where the graph enters; determining an equipment ID associated with the direction code, and sending data to equipment corresponding to the equipment ID through a wireless module.

It can be seen from the above that in the application of the device, the equipment and the method for data transmission by touch disclosed by the disclosure, a direction sensor obtains the equipment IDs of peripheral equipment, pairs the obtained equipment IDs with a direction code, detects a touch operation of a user, determines a touch operation to trigger a data transmission command through a coordinate of a touched graph and transmits data to equipment in the direction touched by the touched graph according to a direction code corresponding to the ID of the equipment; in this way, the transmission process is simple and explicit, extremely great convenience is brought to the user operation and the operation process of data transmission is simplified.

DETAILED DESCRIPTION

The basic idea of the disclosure is to pair equipment IDs of other equipment in the space where a direction sensor locates with a direction code, detect a graphic edge coordinate when a user selects or drags a graph corresponding to data through a touch operation, determine a touch operation to trigger a data transmission command according to the detected graphic edge coordinate and transmit the data to equipment in the direction touched by the graph.

Here, said equipment is equipment which initiates the data transmission; said other equipment are peripheral equipment except the equipment which initiates the data transmission; the equipment ID is used for identifying equipment and is preset in the memory of the equipment; the graphic edge coordinate is a coordinate corresponding to the edge of the graph and is a collection of coordinates; the graph is data in the form of pictures or data document icons; the direction code is used for identifying a direction and the direction is a region in a direction coordinate system which is established with respect to the equipment and regards the equipment as an original point; and the division of the direction can be pre-defined according to the need, and direction sensors are placed in turn in the divided directions.

Figure 1:
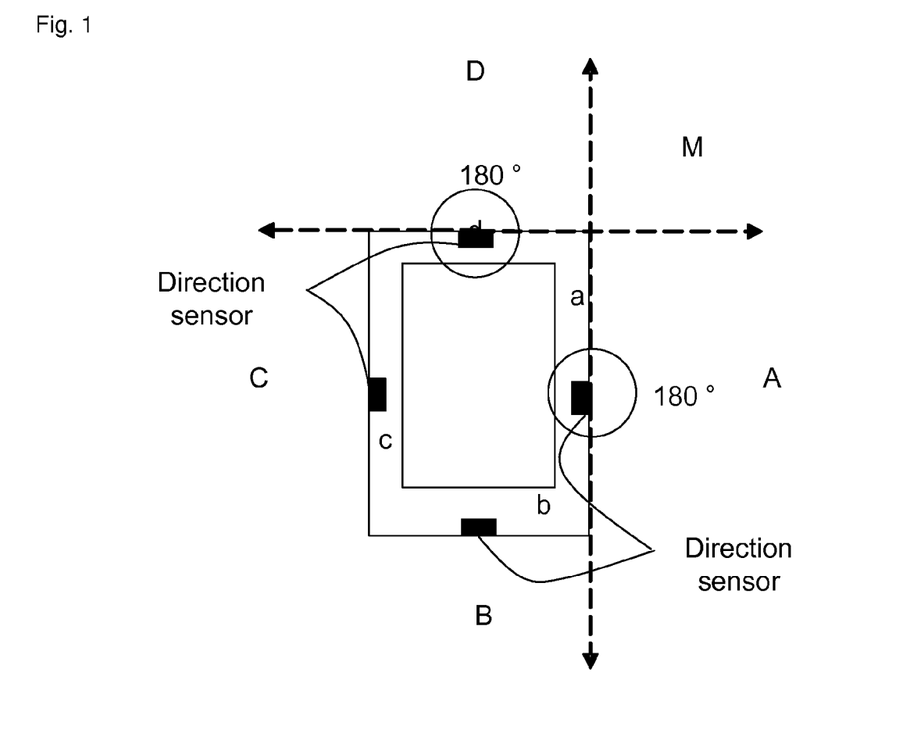
FIG. 1 shows a schematic diagram of direction division and sensor configuration in the disclosure.

An example below is taken to illustrate a relationship between direction division and direction sensors; as shown in FIG. 1 which is a top view of equipment, four planes vertical to a display plane are side faces of the equipment; the sides a, b, c and d are the projection of the side faces; the four planes are pre-defined as boundaries, and four regions deviating from the equipment direction are divided into four directions, that is to say, the regions where the A, B, C and D locate are the regions covered by the four directions; relative to the four directions, four direction sensors are arranged at the four side faces; sometimes, there is an overlapped region between different directions, for example, there is an overlapped region M in the directions A and D.

The disclosure is illustrated below with reference to specific embodiments and accompanying drawings in detail.

Figure 2:
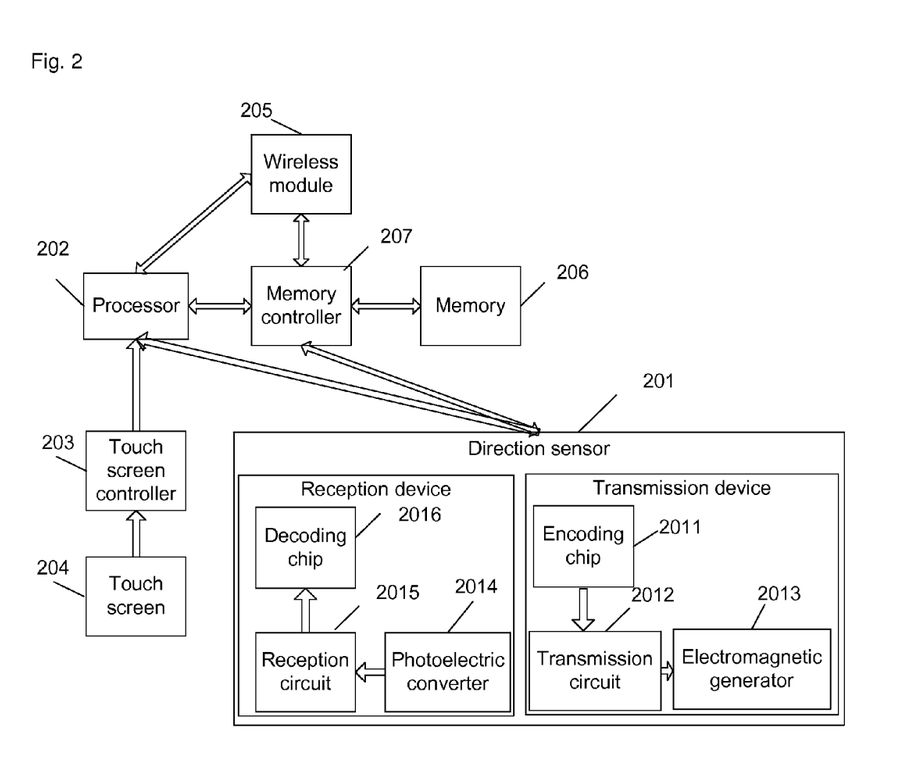
FIG. 2 shows a schematic diagram of a device for data transmission by touch in the disclosure.

A device for data transmission by touch as shown in FIG. 2 includes direction sensors 201, a processor (CPU) 202, a touch screen controller 203, a touch screen 204, a wireless module 205, and a memory 206, wherein several direction sensors 201 are respectively arranged in different directions of equipment to compose a direction sensor module and are used for receiving an electromagnetic wave, obtaining equipment IDs of other equipment in the spaces where the direction sensors locate, sending obtained equipment IDs and their own sensor codes to the CPU 202, wherein the sensor codes are used for identifying the direction sensors and are preset in the direction sensors 201 and the memory 206; the sensor codes correspond to direction codes in the memory 206; and the correspondence may refer to any sensor code uniquely corresponding to any direction code;

the CPU 202 is for pairing received equipment IDs with the direction codes, determining a user touch operation to trigger a data transmission command according to a graphic edge coordinate, and sending the equipment IDs of said other equipment in the direction touched by the graph to the wireless module 205;

the touch screen controller 203 is for converting a signal about a touched graph into a graphic edge coordinate through analogue-digital conversion and sending the graphic edge coordinate to the CPU 202;

the touch screen 204 is for providing a graphic user interface, wherein a user selects or drags a graph corresponding to data through a touch operation so as to send a signal about the touched graph to the touch screen controller 203;

the wireless module 205 is for establishing a wireless connection with wireless modules of other equipment, reading data in the memory 206 and transmitting the data to the equipment corresponding to the received equipment IDs; and the memory 206 is for storing transmitted data and a corresponding relationship between the sensor code and the direction code.

The device further includes:

a memory controller 207 for receiving from the CPU 202 a request that the direction sensors 201 request to obtain an equipment ID of the local equipment, reading the equipment ID of the local equipment from the memory 206 and sending the equipment ID of the local equipment to the direction sensor 201;

the direction sensor 201 is specifically for receiving the electromagnetic wave from equipment in the coverage of an solid angle of the direction sensor itself, demodulating the electromagnetic wave into a pulse electric signal, converting the pulse electric signal into a binary signal, reading the equipment IDs from the binary signal, sending a request of obtaining the equipment ID of the local equipment to the CPU 202, receiving the equipment ID of the local equipment returned by the CPU 202 and compare the equipment ID of the local equipment with the read equipment IDs, and when a read equipment ID is different from the equipment ID of the local equipment, sending the read equipment ID and the sensor code of the direction sensor itself to the CPU 202; and when the read equipment ID is consistent with the equipment ID of the local equipment, not performing any processing;

here, the demodulation includes adjustment of frequency of the binary signal, adjustment of the wavelength of the binary signal, or other existing ways; the solid angle is a range within which the direction sensor transmits or receives the electromagnetic wave, and the projection of the solid angle in the plane shall cover the region of the direction where the solid angle is;

the CPU 202 is for sending the request of obtaining the equipment ID of the local equipment which is sent by the direction sensors 201 to the memory controller 207, receiving the equipment IDs and the sensor codes which are sent by the direction sensors 201, inquiring about direction codes corresponding to the sensor codes in the memory 206, storing the received equipment IDs in the memory 206, and associating the received equipment IDs with the direction codes corresponding to the sensor codes; and as the direction regions may be overlapped, and a plurality of direction sensors 201 may send a same equipment ID, associating the equipment ID with direction codes corresponding to sensor codes of the plurality of the direction sensors 201; and the memory 206 is for storing the equipment ID of the local equipment and a corresponding relationship between an equipment ID and a direction code.

The direction sensor 201 specifically includes a transmission device and a reception device;

wherein the transmission device further includes:

an encoding chip 2011 for sending a request of obtaining the equipment ID of the local equipment to the CPU 202, receiving the equipment ID of the local equipment, encoding the equipment ID to obtain a binary signal and sending the binary signal to a transmission circuit 2012;

the transmission circuit 2012 for modulating the binary signal to a pulse electric signal and sending the pulse electric signal to an electromagnetic wave generator, wherein the modulation includes adjustment of the frequency of the binary signal, or adjustment of the wavelength of the binary signal, or other existing ways;

the electromagnetic wave generator 2013 composed of a reflecting mirror, a refracting lens, a diaphragm or the like, capable of adjusting the solid angle for the electromagnetic wave transmission by adjusting the angle or direction of the reflecting mirror, the refracting lens or the diaphragm, and used for sending the pulse electric signal in the form of electromagnetic wave;

the reception device further includes:

a photoelectric converter 2014 composed of a reflecting mirror, a refracting lens, a diaphragm or the like, capable of adjusting the solid angle for the electromagnetic wave reception by adjusting the angel or direction of the reflecting mirror, the refracting lens or the diaphragm, and used for receiving an electromagnetic wave, converting the wave to a pulse electric signal and sending the pulse electrical signal to the reception circuit 2015;

the reception device 2015 for demodulating the pulse electric signal into a binary signal and sending the binary signal to a decoding chip 2016, wherein the demodulation includes adjustment of the frequency or wavelength of the pulse electric signal, or other existing ways; and the decoding chip 2016 for reading the equipment IDs from the binary signal, sending a request of obtaining the equipment ID of the local equipment to the CPU 202, receiving the equipment ID of the local equipment returned by the CPU 202, comparing the read equipment IDs with the received equipment ID of the local equipment, and when determining that a read equipment ID is different from the equipment ID of the local equipment, sending the read equipment ID and the sensor code of the direction sensor 201 to the CPU 202.

The CPU 202 is specifically for comparing the received graphic edge coordinate with a display edge coordinate in the memory 206 and determining the touch operation to trigger the data transmission command when any graphic edge coordinate is consistent with any display edge coordinate which indicates that the graph touches a display edge, wherein the display edge corresponds to the direction, and is used for identifying the boundary of the direction; the coordinates of the display edge are composed of coordinates of points at the display edge and are preset in the memory 206 together with the direction code of the corresponding direction; and/or the CPU 202 is for comparing the received graphic edge coordinate with a display region coordinate in the memory, and determining the touch operation to trigger the data transmission command when all graphic edge coordinates are consistent with display region coordinates which indicates the graph enters into a display region, wherein the display region corresponds to the direction, and is used for identifying the region where the direction locates; and the display region coordinates are a coordinate array that is composed of coordinates of points in the display region, and is preset in the memory 206 together with the direction code of the corresponding direction.

The CPU 202 is specifically for inquiring about a direction code corresponding to a coordinate of the display edge touched by the graph or to a coordinate of the display region where the graph enters, and sending an equipment ID associated with the direction code to the wireless module 205; and the memory 206 is further for storing a corresponding relationship between a display edge coordinate and a direction code and/or storing a corresponding relationship between a display region coordinate and a direction code.

Figure 3:
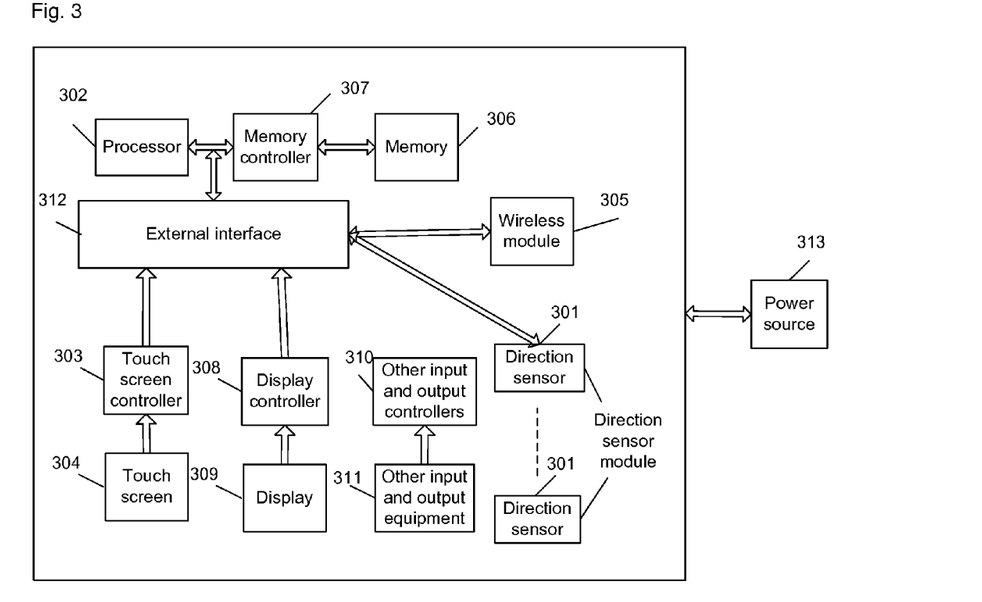
FIG. 3 shows a schematic diagram of equipment for data transmission by touch in the disclosure.

Based on the device above, the disclosure also provides equipment for data transmission by touch; and as shown in FIG. 3, the equipment includes a power source 313, an external interface 312, a touch screen 304, a display 309, an other input and output equipment 311, a touch screen controller 303, a display controller 308, other input and output controllers 310, a wireless module 305, a CPU 302, a memory 306, a memory controller 307 and a plurality of direction sensors 301, wherein the power source 313 is for providing a work current to the equipment;

an external interface 312 is for connecting various input and output controllers, including the display controller 310, the touch screen controller 303, other input and output controllers 310, the CPU 302 and the memory controller 307;

the display 309 is for receiving an analogue signal sent by the display controller 308 and displaying the data or graph corresponding to the analogue signal to a user;

the display controller 308 is for receiving an event signal sent by the CPU 302, converting the event signal to an analogue signal through digital-analogue conversion and sending the analogue signal to the display 309;

said other input and output equipment 311 is for receiving an external signal and sending the signal to said other input and output controllers 310; and receiving a signal from said other input and output controllers 310 and sending the signal to said other equipment;

said other input and output controllers 310 are for receiving the signal sent by the other input and output equipment 311, converting the received signal into data identifiable by the CPU 302 through analogue-digital conversion or other processing ways and sending the data to the CPU 302 through the external interface 312;

several direction sensors 301 compose a direction sensor module; the direction sensors 301 are respectively located in different directions of the equipment and for receiving electromagnetic waves, obtaining equipment IDs of other equipment in the spaces where the direction sensors 301 locate and sending the obtained equipment IDs and sensor codes to the CPU 302; the sensor codes are identifiers of the direction sensors 301 and are preset in the direction sensors 301 and the memory 306; in the memory 306, the sensor codes correspond to direction codes; and the correspondence may refer to any sensor code uniquely corresponds to any direction code;

the CPU 302 is for pairing received equipment IDs with direction codes; determining a user touch operation to trigger a data transmission command according to a graphic edge coordinate, sending equipment IDs of other equipment in the direction touched by the graph to the wireless module 305; determining an event corresponding to the graphic edge coordinate and sending an event signal to the display controller 308, wherein the determining an event comprises: inquiring about a preset corresponding relationship between a coordinate and an event in the memory 306 according to the received graphic edge coordinate, and determining the event corresponding to the graphic edge coordinate;

the touch screen controller 303 is for converting a signal about a touched graph to a graphic edge coordinate through analogue-digital conversion and sending the graphic edge coordinate to the CPU 302;

the touch screen 304 is for providing a graphic user interface, wherein a user selects or drags a graph corresponding to data through a touch operation so as to send a signal about the touched graph to the touch screen controller 303;

the wireless module 305 is for establishing a wireless connection with wireless modules of other equipment, reading data in the memory 306 and transmitting the data to equipment corresponding to the received equipment IDs; and the memory 306 is for storing transmitted data, a corresponding relationship between a sensor code and a direction code, and a corresponding relationship between a coordinate and an event.

The CPU 302, the touch screen 304, the touch screen controller 303, the memory 306, the wireless module 305 and the direction sensors 301 all belong to touch transmission devices; the touch transmission devices have basic functions same as each part of the device as shown in FIG. 2, and the difference is only that data interaction between the touch screen controller 303, the wireless module 305 as well as the direction sensors 301 and the CPU 302 as well as the memory 306 is carried out through the external interface 312, and the CPU 302 interacts data with the display controller 308 and other input and output controllers 310.

Figure 4:
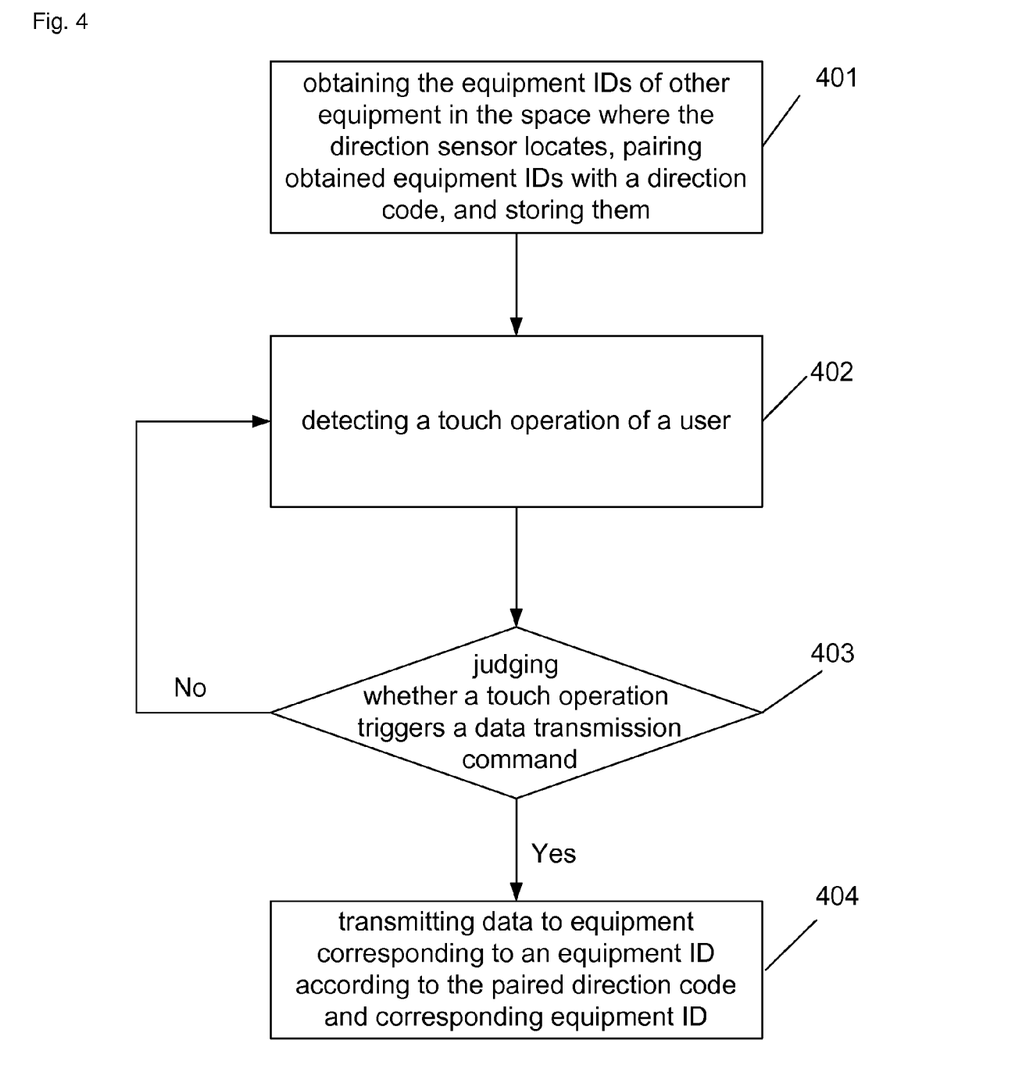
FIG. 4 shows a flowchart of a method for data transmission by touch in the disclosure.

The disclosure also provides a method for data transmission by touch as shown in FIG. 4, including the following steps:

Step 401, obtaining equipment IDs of other equipment in the space where a direction sensor locates, pairing obtained equipment IDs with a direction code and storing them;

here, the equipment is wirelessly connected with other peripheral equipment through a wireless module; and a direction sensor module which is composed of several direction sensors is turned on, wherein it can be automatically started when the equipment is turned on, or turned on through a switch or other ways when data transmission is needed;

the direction sensor is for receiving an electromagnetic wave from the equipment in the coverage of a solid angle of the direction sensor itself or sending the electromagnetic wave to the equipment in the coverage of the solid angle of the sensor itself; wherein the solid angle is a range within which the direction sensor transmits or receives the electromagnetic wave, the projection of the solid angle in the plane shall cover the region of the direction, and the size of the solid angle can be adjusted by adjusting the angle or direction of the direction sensor. The equipment receives electromagnetic waves from other equipment through the direction sensor, obtains equipment IDs of said other equipment from the electromagnetic waves, pairs obtained equipment IDs with the direction code and stores them;

Step 402, detecting a touch operation of a user;

generally, the equipment is located at a graphic user interface; the graphic user interface refers to that data are shown in the form of pictures or document icons; a user clicks or drags a graph corresponding to data to be transmitted through a touch operation; and the equipment detects the touch operation of the user;

the specific process of the detection is as follows: the touch screen of the equipment sends a signal about a graph touched by the user to the touch screen controller; the touch screen controller converts the signal about the touched graph into a graphic edge coordinate and sends the graphic edge coordinate to the CPU; the CPU reads an event corresponding to the graphic edge coordinate stored in the memory and sends the event to the display controller; the display controller performs digital-analogue conversion on the event so as to obtain an analogue signal and sends the analogue signal to the display; and the display displays the signal to the user, for example, when the corresponding position of a graph is touched, the graph is shown as being selected, and when the user keeps on touching the graph and moves the touch point, the graph is shown as being dragged;

Step 403, judging whether the touch operation triggers a data transmission command; if so, executing the Step 404, otherwise, executing the Step 402;

here, the specific judgment process is as follows: the equipment consecutively detects the touch operation of the user and triggers the data transmission command when determining that the graph touches the display edge of the direction or the graph enters into the display region of the direction;

the specific process of determining that the graph touches the display edge of the direction or the graph enters into the display region of the direction is as follows: the equipment compares a detected graphic edge coordinate with a display edge coordinate, and it is indicated that the graph touches the display edge of the direction when any graphic edge coordinate is consistent with any display edge coordinate, wherein the display edge corresponds to the direction and identifies the boundary of the direction, and the coordinates of the display edge are composed of coordinates of the points at the display edge and are preset in the memory together with the direction code of the corresponding direction; and/or the equipment compares a detected graphic edge coordinate with a display region coordinate and it is indicated that the graph enters into the display region of the direction when all the graphic edge coordinates are consistent with display region coordinates, wherein the display region corresponds to the direction and is used for identifying the region where the direction locates, and the display region coordinates are a coordinate array which is composed of the coordinates of the points in the display region and is preset in the memory together with the direction code of the corresponding direction;

Step 404, transmitting data to equipment corresponding to equipment IDs according to the paired direction codes and corresponding equipment IDs;

In the step, the equipment inquires in the memory about a direction code corresponding to the display edge touched by the graph or to the display region where the graph enters, determines equipment IDs associated with the direction code and sends data corresponding to the graph to equipment corresponding to the equipment IDs of other equipment through a wireless module.

Figure 5:
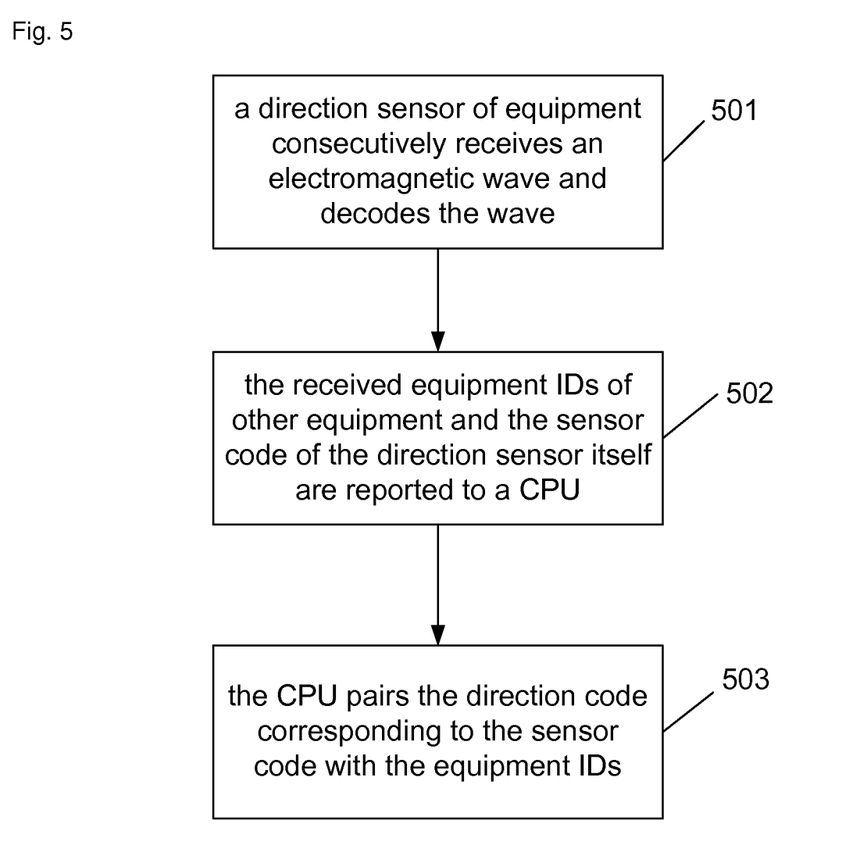
FIG. 5 shows a flowchart of a method for pairing an equipment ID with a direction code in the disclosure.

The process of pairing equipment IDs with a direction code as shown in FIG. 5 is illustrated below through an embodiment:

Step 501, a direction sensor of the equipment consecutively receives an electromagnetic wave and decodes the wave;

generally, the reception device of the direction sensor receives a sensible electromagnetic wave, converts the electromagnetic wave to a pulse electric signal, demodulates the pulse electric signal into a binary signal, reads equipment IDs of other equipment from the binary signal; and the equipment IDs of said other equipment are respectively stored in memories of said other equipment and are obtained respectively by direction sensors of said other equipment from the memories of said other equipment;

the obtaining process is as follows: the direction sensor sends information of obtaining an equipment ID of local equipment to the CPU; the CPU sends the information of requesting for obtaining the equipment ID of the local equipment from the direction sensor to the memory controller; the memory controller reads equipment IDs in the memory and sends the equipment IDs to the direction sensor; and the transmission device writes the equipment IDs into a binary signal and modulates the binary signal into a pulse electric signal and sends the pulse electric signal in the form of electromagnetic wave through the electromagnetic generator in the transmission device; wherein the modulation is to adjust the frequency of the binary signal or the wavelength of the binary signal to form a pulse string signal;

Step 502, reporting received equipment IDs of other equipment and a sensor code of the direction sensor to the CPU;

here, the direction sensor determines the received equipment IDs are the equipment IDs of other equipment and reports the equipment IDs to the CPU; and the process of determining the equipment IDs is as follows: the direction sensor compares a received equipment ID with the equipment ID of the local equipment obtained from the memory; if the two equipment IDs are same, then the received equipment ID is determined to be the equipment ID of the local equipment, which happens possibly because an electromagnetic wave sent by the direction sensor itself is occasionally reflected by other objects and then received by the direction sensor itself, in this case, the direction sensor performs no processing; and if the received equipment ID is different from the equipment ID of the local equipment, the direction sensor sends the received equipment ID and the sensor code of the direction sensor itself to the CPU; wherein the direction code is used for marking the direction, is associated with any sensor code and is preset in the memory;

Step 503, the CPU pairs a direction code corresponding to the sensor code with the received equipment ID.

Here, the CPU stores the received sensor code and equipment ID in the memory and associates the equipment ID with the direction code corresponding to the sensor code.

A plurality of direction sensors may report the same equipment ID as an overlapped region may exist in directions, therefore, the CPU associates the equipment ID with direction codes corresponding to a plurality of sensor codes.

The above is only the preferred embodiment of the disclosure and not intended to limit the scope of protection of the disclosure. Any modifications, equivalent replacements, improvements or the like within the spirit and principle of the disclosure shall fall within the scope of protection of the disclosure.

The invention claimed is:

1. A device for data transmission by touch, comprising:
at least one direction sensor configured to receive an electromagnetic wave, obtain equipment IDs of other equipment in a space where the direction sensor is, and send obtained equipment IDs and a sensor code of the direction sensor itself to a Central Processing Unit (CPU);
a touch screen configured to send a signal about a touched graph to a touch screen controller according to a graph touch operation performed by a user;
the touch screen controller configured to convert the signal about the touched graph into a graphic edge coordinate through analogue-digital conversion and send the graphic edge coordinate to the CPU;
the CPU configured to pair the equipment IDs with a preset direction code, determine a user touch operation to trigger a data transmission command according to the graphic edge coordinate, and send an equipment ID in a direction touched by the graph to a wireless module; and
the wireless module configured to transmit data to equipment corresponding to the received equipment ID.

2. The device according to claim 1, further comprising:
a memory controller configured to receive from the CPU a request that the direction sensor requests to obtain an equipment ID of local equipment, and send the equipment ID of the local equipment to the direction sensor.

3. The device according to claim 2, wherein
the direction sensor is further configured to receive the electromagnetic wave, demodulate the wave into a pulse electric signal, convert the pulse electric signal into a binary signal, and read the equipment IDs of said other equipment from the binary signal; send the request of obtaining the equipment ID of the local equipment to the CPU, receive the equipment ID of the local equipment, compare the equipment ID of the local equipment with the read equipment IDs, and when determining that the equipment ID of the local equipment is different from a read equipment ID, send the read equipment ID and the sensor code of the direction sensor itself to the CPU; and
the CPU is further configured to send the request of obtaining the equipment ID of the local equipment to the memory controller; receive the read equipment ID and the sensor code, inquire about a stored direction code corresponding to the sensor code, associate the received equipment ID with the direction code corresponding to the sensor code and store them; compare the graphic edge coordinate received with a stored display edge coordinate, and when determining the graph touches a direction display edge, determine the touch operation to trigger the data transmission command; or compare the graphic edge coordinate received with a stored display region coordinate, and when determining that the graph enters into a direction display region, determine the touch operation to trigger the data transmission command; inquire about a direction code corresponding to a coordinate of the display edge touched by the graph or to a coordinate of the display region where the graph enters, and send an equipment ID associated with the direction code to the wireless module.

4. The device according to claim 1, wherein the direction sensor further comprises a transmission device and a reception device;
wherein the transmission device comprises:
an encoding chip configured to send a request of obtaining an equipment ID of local equipment to the CPU, receive the equipment ID of the local equipment, encode the equipment ID of the local equipment to obtain a binary signal and send the binary signal to a transmission circuit;
the transmission circuit configured to modulate the binary signal into a pulse electric signal and send the pulse electric signal to an electromagnetic wave generator; and
the electromagnetic wave generator configured to send the pulse electric signal in the form of the electromagnetic wave; and
the reception device comprises:
a photoelectric converter configured to receive an electromagnetic wave, convert the electromagnetic wave into a pulse electric signal, and send the pulse electric signal to a reception circuit;
the reception circuit configured to convert the pulse electric signal into a binary signal and send the binary signal to a decoding chip; and
the decoding chip configured to read the equipment IDs of said other equipment from the binary signal; send a request of obtaining the equipment ID of the local equipment to the CPU, receive the equipment ID of the local equipment returned by the CPU, compare the read equipment IDs with the equipment ID of the local equipment, and when determining that a read equipment ID is different from the equipment ID of the local equipment, send the read equipment ID and the sensor code of the direction sensor to the CPU.

5. The device according to claim 2, wherein the direction sensor further comprises a transmission device and a reception device;
wherein the transmission device comprises:
an encoding chip configured to send a request of obtaining the equipment ID of the local equipment to the CPU, receive the equipment ID of the local equipment, encode the equipment ID of the local equipment to obtain a binary signal and send the binary signal to a transmission circuit;
the transmission circuit configured to modulate the binary signal into a pulse electric signal and send the pulse electric signal to an electromagnetic wave generator; and
the electromagnetic wave generator configured to send the pulse electric signal in the form of the electromagnetic wave; and the reception device comprises:
- a photoelectric converter configured to receive an electromagnetic wave, convert the electromagnetic wave into a pulse electric signal, and send the pulse electric signal to a reception circuit;
- the reception circuit configured to convert the pulse electric signal into a binary signal and send the binary signal to a decoding chip; and
- the decoding chip configured to read the equipment IDs of said other equipment from the binary signal; send a request of obtaining the equipment ID of the local equipment to the CPU, receive the equipment ID of the local equipment returned by the CPU, compare the read equipment IDs with the equipment ID of the local equipment, and when determining that a read equipment ID is different from the equipment ID of the local equipment, send the read equipment ID and the sensor code of the direction sensor to the CPU.

6. The device according to claim 3, wherein the direction sensor further comprises a transmission device and a reception device;
wherein the transmission device comprises:
- an encoding chip configured to send the request of obtaining the equipment ID of local equipment to the CPU, receive the equipment ID of the local equipment, encode the equipment ID of the local equipment to obtain a binary signal and send the binary signal to a transmission circuit;
- the transmission circuit configured to modulate the binary signal into a pulse electric signal and send the pulse electric signal to an electromagnetic wave generator; and
- the electromagnetic wave generator configured to send the pulse electric signal in the form of the electromagnetic wave; and the reception device comprises:
- a photoelectric converter configured to receive an electromagnetic wave, convert the electromagnetic wave into a pulse electric signal, and send the pulse electric signal to a reception circuit;
- the reception circuit configured to convert the pulse electric signal into a binary signal and send the binary signal to a decoding chip; and
- the decoding chip configured to read the equipment IDs of said other equipment from the binary signal; send the request of obtaining the equipment ID of the local equipment to the CPU, receive the equipment ID of the local equipment returned by the CPU, compare the read equipment IDs with the equipment ID of the local equipment, and when determining that a read equipment ID is different from the equipment ID of the local equipment, send the read equipment ID and the sensor code of the direction sensor to the CPU.

7. A method for data transmission by touch, comprising:
receiving an electromagnetic wave from other equipment and obtaining equipment IDs of said other equipment;
pairing a preset direction code with obtained equipment IDs; when a user performs a touch operation on a graph, detecting a graphic edge coordinate of the touched graph; determining a touch operation to trigger a data transmission command according to the graphic edge coordinate; and sending data to equipment in a direction touched by the graph according to a direction code of the direction touched by the graph and a corresponding equipment ID when the touch operation triggers the data transmission command.

8. The method according to claim 7, wherein the receiving an electromagnetic wave from other equipment, obtaining equipment IDs of said other equipment, and pairing a preset direction code with obtained equipment IDs comprises:
- receiving, by a direction sensor, the electromagnetic wave; demodulating, by the direction sensor, the received electromagnetic wave into a pulse electrical signal and converting, by the direction sensor, the pulse electric signal into a binary signal; reading, by the direction sensor, the equipment IDs of said other equipment from the binary signal, comparing, by the direction sensor, the equipment IDs with an equipment ID of local equipment, and when determining that a read equipment ID is inconsistent with the equipment ID of the local equipment, reporting, by the direction sensor, the read equipment ID and a sensor coder of the direction sensor itself to a Central Processing Unit (CPU); and
- associating, by the CPU, the read equipment ID with a direction code corresponding to the sensor code and storing them by the CPU.

9. The method according to claim 8, wherein the determining a touch operation to trigger a data transmission command according to the graphic edge coordinate comprises:
- comparing, by the CPU, a received graphic edge coordinate with a stored display edge coordinate, and determining, by the CPU, the touch operation to trigger the data transmission command when any graphic edge coordinate is consistent with any display edge coordinate which indicates that the graph touches a display edge; or
- comparing, by the CPU, a received graphic edge coordinate with a stored display region coordinate, and determining, by the CPU, the touch operation to trigger the data transmission command when all graphic edge coordinates are consistent with display region coordinates which indicates that the graph enters into a direction display region.

10. The method according to claim 9, wherein the sending data to equipment in a direction touched by the graph according to a direction code of the direction touched by the graph and a corresponding equipment ID when the touch operation triggers the data transmission command comprises:
- inquiring about a direction code corresponding to a coordinate of the display edge touched by the graph or to a coordinate of the display region where the graph enters; determining an equipment ID associated with the direction code, and sending data to equipment corresponding to the equipment ID through a wireless module.

* * * * *